United States Patent
Roskam et al.

[11] Patent Number: 5,987,997
[45] Date of Patent: Nov. 23, 1999

[54] ULTRASOUND FLOW MEASUREMENT METHOD

[75] Inventors: Abram Klaas Roskam, Sleeuwijk; Jan Aart van Bekkum, Hoornaar; Vladimir Smychliaev, Dordrecht, all of Netherlands

[73] Assignee: Krohne A.G., Switzerland

[21] Appl. No.: 08/836,016

[22] PCT Filed: Nov. 18, 1996

[86] PCT No.: PCT/EP96/05082

§ 371 Date: Sep. 15, 1997

§ 102(e) Date: Sep. 15, 1997

[87] PCT Pub. No.: WO97/19326

PCT Pub. Date: May 29, 1997

[30] Foreign Application Priority Data

Nov. 22, 1995 [NL] Netherlands ............................ 1001719

[51] Int. Cl.⁶ .................................................. G01F 1/66
[52] U.S. Cl. ..................................................... 73/861.29
[58] Field of Search ........................... 73/861.27, 861.28, 73/861.29, 861.31

[56] References Cited

U.S. PATENT DOCUMENTS

| | | | |
|---|---|---|---|
| 3,940,985 | 3/1976 | Wyler | 73/861.31 |
| 4,102,186 | 7/1978 | Brown | 73/861.31 |
| 4,331,025 | 5/1982 | Ord, Jr. | 73/861.02 |
| 4,432,243 | 2/1984 | Lowell et al. | 73/861.31 |
| 5,546,813 | 8/1996 | Hastings et al. | 73/861.29 |
| 5,705,753 | 1/1998 | Hastings et al. | 73/861.28 |

*Primary Examiner*—William Oen
*Assistant Examiner*—Jewel V. Thompson
*Attorney, Agent, or Firm*—Cesari and McKenna, LLP

[57] ABSTRACT

The invention concerns a method and a device for ultrasound measurement of the flow of flowing media with a measuring tube (1), with at least two pairs of ultrasound transducers arranged on the measuring tube, each forming a measuring path (M1,M2,M3,M4,M5), with a transducer (2) determining the velocities of the medium along the measuring paths (M1,M2,M3,M4,M5) from the signals of the pair of ultrasound transducers and with an adder (3) determining the flow quantity of the medium from the velocities of the medium along the measuring paths (M1,M2,M3,M4,M5).

According to the invention, such a method and such a device are designed with a Reynolds' number meter (5) that determines the Reynolds' number constantly and a flow-quantity corrector (6) connected to the adder (3) and the Reynolds' meter (5).

55 Claims, 10 Drawing Sheets

ULTRASOUND FLOW MEASUREMENT METHOD

According to a first theory, the invention concerns an ultrasound method of measuring the flow of flowing media using a measuring tube and at least two pairs of ultrasound transducers attached to the measuring tube forming a measuring path, in which the amount of flowing medium is determined from the velocity of the medium along at least two measuring paths. The term medium here includes both liquids and gases.

According to a second theory, the invention also concerns a device for using the ultrasound method of measuring the flow of flowing media with a measuring tube, at least two pairs of ultrasound transducers arranged on the measuring tube forming a measuring path, a transducer determining the velocities of the medium along the measuring path from the signals of the pair of ultrasound transducers and an adder that finds the amount of flowing medium from the velocity of the medium along the measuring paths.

The known methods and devices for measuring the average velocity and the amount of flow of a flowing medium by ultrasound use a large number of measuring paths, which form the supporting points of a digital integration method that is as optimal as possible Here, the integration method is normally determined by the dimension or geometry of the measuring path and the measuring tube. There are various traditional optimal integration methods by Chebichev, Gauss or Taylor, which are given for example in unexamined patent applications CH-A-610 038, DE-A-30 38 213 and EP-A-0 125 845. The methods and devices known from these unexamined patent applications are dependent on the viscosity of the medium and hence on the Reynolds' number for their precision. For example, please refer to the article "A New Integration Technique for Flow-meters with Chordal Paths" in Flow Measurement and Instrumentation, vol. 1, No. 4, July 1990, Pages 216 to 224.

The methods and devices known from said unexamined patent applications for ultrasound flow measurement have insufficient precision due to their dependence on the viscosity of the medium, since the viscosity can change sharply during measurement, particularly as a result of temperature changes. However, high precision is generrly required particularly when measuring quantities of flowing gases, petroleum products and chemical products, for example second important problem with the known methods and devices is disturbances in the velocity profile caused by integration effects, which also has a negative influence on precision.

The products specified have extraordinarily high requirements for measurement precision. For example, for petroleum, in the range of a flow quantity from 50% to 100% of the nominal flow quantity, the maximum error is ±0.15%, and in the range of a flow quantity 10% to 100% of the nominal flow quantity, the maximum error is ±0.25%. In the past, this precision could only be guaranteed with turbine meters.

When measuring the quantity of a medium flowing in a measuring tube, it is advantageous not to disturb the flow of the medium. At the same time, the point is to obtain the high measurement precision required using a relatively inexpensive device, which also has a long life it is also advantageous if such a device can be calibrated with water after production and can then be recalibrated with other liquids or even gases during operation by the users, in order to guarantee the precision required.

The task of the invention is therefore to eliminate the problems mentioned and to provide a method and a device with which such high precision can be guaranteed. Another task of the invention consists of making it possible with the method and device in the invention to sharply reduce the influence of the viscosity of the medium. The task of the invention is also to provide a method and a device that reduce the influence of changes in the flow profile and that offer the possibility of self-calibration during operation. Finally, it is also the task of this invention to provide a method and a device that make possible constant determination of viscosity of the medium, hence in "real-time," and that also make it possible to identify the type of medium, for example, the type of flowing petroleum, based on the viscosity and the sound velocity and/or sound dissipation. According to the invention, the tasks listed and inferred above in the first theory are solved with an ultrasound method of measuring the flow of flowing media where the Reynolds' number of the flowing medium is constantly measured and where the value for the flow quantity is corrected using the value for the Reynolds, number In one advantageous design, the Reynolds' number is determined using the velocity of the medium along at least two measuring paths. These velocities of the flowing medium on various measuring paths can be determined simultaneously or in sequence.

In the second theory of the invention, the tasks listed and inferred above are solved with a device for using the ultrasound method of measuring the flow of flowing media, characterized by the fact that it has a Reynolds' number meter that constantly determines the Reynolds' number and a flow-quantity corrector connected to the adder and the Reynolds' number meter.

One especially preferred design of this invention provides that before the Reynolds' number is determined during operation, an operating flow profile based on the velocity measured is recorded and in the event that the current flow profile is disturbed by inlet effects or other causes, an arithmetic correction of it is made based on a predetermined undisturbed calibration flow profile.

Now there are many ways of designing and improving the ultrasound method of measuring flowing media in the invention and the device for using the ultrasound method of measuring flowing media in the invention. For this, please refer on one hand to the patent claims subordinate to Patent claims 1 to 25, and on the other hand to the description of preferred examples of embodiment in connection with the drawings.

With the device used for the ultrasound measurement method in the invention, at least two, but advantageously five velocities are measured on different measuring paths; the measuring paths are formed by pairs of ultrasound transducers consisting of ultrasound transducers assigned to one another and arranged on different sides of the measuring tube Preferably, a flow profile of the medium in a line connected to the device in the invention has been made using inlet and outlet sections and developed as fully as possible. The calibration flow profile mentioned is preferably the best possible approximation of the flow profile in a fully developed flow. It is known from practice that the velocities on certain measuring paths are less dependent on the Reynolds' number and on other measuring paths more dependent on it. The measuring paths less dependent on the Reynolds' number are those at a distance of one half the radius of the measuring tube to the wall of the measuring tube. On the other hand, the measuring paths more dependent on the Reynolds' number are, for example, in the middle or near the walls of the measuring tubes. With the latter measuring paths, the flow profile has a maximum influence on the Reynolds' number. The device in the invention can also work with more or less than five measuring paths, but there must be at least one measuring path among them that is relatively less dependent on the Reynolds' number.

Since the Reynolds' number in the device in the invention is measured constantly, this measurement can be used in real time to correct the amount of flow and potentially to determine the viscosity and, if necessary, also to identify the medium. This will be explained below.

Preferably, the velocities of the flowing medium measured on the measuring paths are used to determine the Reynolds' number. However, it is also possible to determine the Reynolds' number in other ways, for example based on measurement of the ultrasound damping The value for the Reynolds' number found is then used to make a correction in the flow quantity using a error curve. Of course, a value for the volume can also be determined from the average velocity and the flow quantity.

Figure 1:
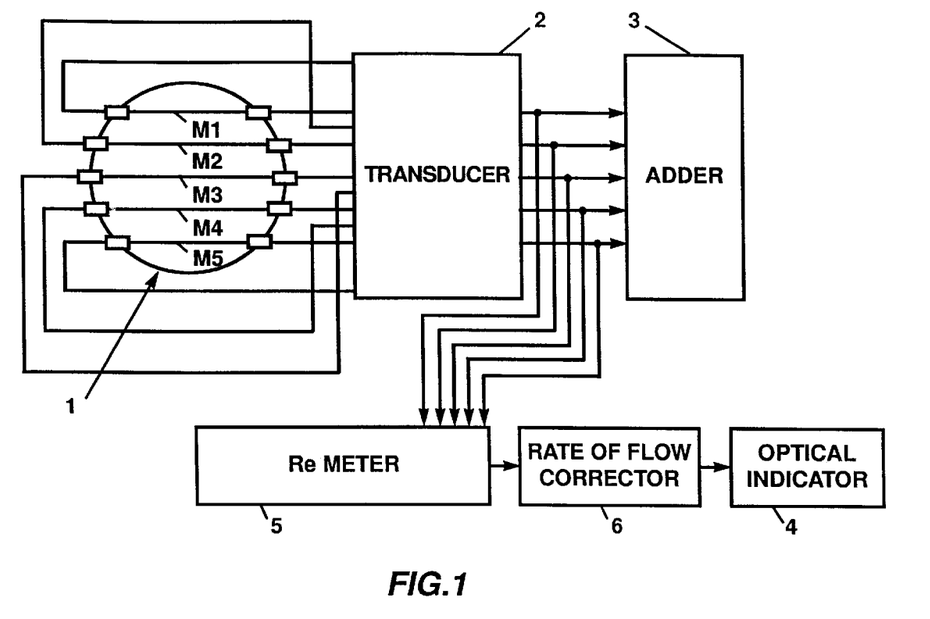
FIG. 1 shows a block diagram of a first example of embodiment of a device according to the invention for using an ultrasound method of measuring flowing media, FIGS. 2 a)–f) shows a flow diagram with explanations of the processes in the correction of the flow profile, FIGS. 3 a),b) shows a graphic example of a correction in flow profiles with high Reynolds' numbers and low Reynolds' numbers, FIGS. 4 a),b) shows graphs of the improvement in precision when the method in the invention is used for media with different viscosities.

The method and the device for using it will now be explained with reference to FIG. 1. Five pairs of ultrasound transducers connected to measuring tube 1 and forming measuring paths M1 to M5 are connected to a transducer 2, which determines the various velocities of the flowing medium along measuring paths M1 to M5, for example from the running-time differences in the ultrasound signals. These velocities are fed to an adder 3 via various units explained later, where they are multiplied by corresponding weight factors and then totaled. The average velocity close to the output of the adder 3, hence the flow quantity for the surface area of the cross section of the measuring tube, is close to a flow corrector 6 for correcting the flow quantity. An error curve shown for example in FIG. 8 based on empirical data is stored in the flow corrector 6, and besides the Reynolds' number, it contains all other technological tolerances connected with the device in the invention. These tolerances are carefully measured after production of the device in the invention that uses the ultrasound method of flow measurement in the invention. The flow quantity calculated by the transducer 2 is now corrected based on a Reynolds' number determined by a Reynolds' number meter 5. The corrected flow quantity given by the flow corrector 6 is then shown by an optional indicator device 4. As already mentioned, the device in the invention can be calibrated with water, and the measurement results obtained during calibration can also be transferred to other media, like other liquids and even gases, since the following applies to the Reynolds' number Re:

$$Re = \frac{V_w \cdot D}{v_w} = \frac{V_m \cdot D}{v_m}$$

and $$v_m = \frac{V_m}{V_w} \cdot v_w = \frac{V_m \cdot D}{Re}$$

where $V_w$ and $V_m$ are the flow velocities of water and a second medium. $v_w$ and $v_m$ are the kinematic viscosities of water and the medium, while D is the diameter of the measuring tube 1. At 20° C., the following applies:

$$V_{water} = 10^{-6} \text{ m}^2/\text{s}$$

and $$V_{air} = 15 \cdot 10^{-6} \text{ m}^2/\text{s}$$

This means that a device calibrated with water using the ultrasound method of measuring the flow in the invention works with the medium air, if the velocity of the air is higher by a factor of 15 than the velocity of the water during calibration.

Before determining the Reynolds' number, it is important to check the symmetry of the flow profile using the velocity ratios or velocity differences. If the actual flow profile is not disturbed or fully developed, the measured velocities will be used for further processing. A high symmetry of the flow profile is promoted, for example by putting a Venturi nozzle in the line.

Before the device in the invention is started up by the user, it is calibrated, with water for example. Calibration is done in the range in which the device will later be used, for example in a range for the average velocity of 0.1 m/s to 6 m/s, for a large number of measuring points, for example for 10%, 20%, 50% and 100% of the maximal average velocity. During this calibration, the velocities of the flowing medium measured for each measuring path are filed in a storage device when the calibration flow profile is not disturbed. This so-called calibration-profile matrix is characteristic for the device using the ultrasound method of flow measurement in the invention, since this matrix contains all of the mechanical, electronic, acoustic and hydraulic tolerances.

When correcting the symmetry of the current flow profile, two cases that depend on the Reynolds' number must be differentiated. On one hand, the case where one is working with large Reynolds' numbers above roughly 100,000 and, on the other hand, the case where one is working with smaller Reynolds' numbers. In the first case, the calibration-profile matrix for five measuring paths //EPM// takes the following form:

$$\|EPM\| = \begin{pmatrix} V1p_{100\%} & \cdots & V5p_{100\%} \\ V1p_{50\%} & \cdots & V5p_{50\%} \\ \vdots & \vdots & \vdots \\ V1p_{10\%} & \cdots & V5p_{10\%} \end{pmatrix} \cdot \begin{pmatrix} G_1 \\ G_2 \\ \vdots \\ G_5 \end{pmatrix} = \begin{pmatrix} \sum V p_{100\%} \\ \sum V p_{50\%} \\ \vdots \\ \sum V p_{10\%} \end{pmatrix} \quad \text{(Equation 1)}$$

where

V1p, ... V5p are the velocities of the flowing medium along the corresponding measuring paths during the calibration flow profile, $\Sigma$Vp is the corresponding average velocity or flow quantity per measuring tube cross section at the calibration flow profile, G1, . . . G5 are the weight factors assigned to the measuring paths, and 10%, . . . 100% are the measuring points in the operating range.

With the device using the method in the invention mounted and ready for operation, first the operating profile matrix //BPM// is recorded in another Calibration process, and takes the following form:

$$\|BPM\| = \begin{pmatrix} V1b_{100\%} & \cdots & V5b_{100\%} \\ V1b_{50\%} & \cdots & V5b_{50\%} \\ \vdots & \vdots & \vdots \\ V1b_{10\%} & \cdots & V5b_{10\%} \end{pmatrix} \cdot \begin{pmatrix} G_1 \\ G_2 \\ \vdots \\ G_5 \end{pmatrix} = \begin{pmatrix} \sum Vb_{100\%} \\ \sum Vb_{50\%} \\ \vdots \\ \sum Vb_{10\%} \end{pmatrix} \quad \text{(Equation 2)}$$

where

V1b . . . V5b re the velocities along the corresponding measuring paths with the operating flow profile, $\Sigma$Vb is the corresponding average speed or flow quantity per measuring tube cross section at the operating flow profile, and G1, . . . G5 are in turn the weight factors of the measuring paths, For the operating profile matrix //BPM// just introduced, the flow quantities in the measuring tube in a uniformity range, hence for Reynolds' numbers greater than 100,000, identical to the flow quantities when the calibration flow profile is recorded, are set artificially—for example using a mobile, calibrated flow-quantity generator. In this case, the following is true:

$$\Sigma Vb_{100\%} = \Sigma Vp_{100\%} \quad \text{(Equation 3)}$$

However, in practice, it is difficult to make Equation 3 come out precisely enough, since frequently the same flow quantities cannot be set exactly. To be able to correct the flow profile, Equation 3 is put in the following form:

$$\beta \cdot \Sigma Vb_{100\%} = \Sigma Vp_{100\%} \quad \text{(Equation 3a)}$$

In Equation 3a, $\beta$ is an interpolation factor to correct the fact that the same flow quantities cannot generally be set. Equation 3a is identical to $$\beta \ldots V5b_{100\%} \cdot G5 \cdot \beta \| = \|\Sigma V_{P_{100\%}}\| \quad \text{(Equation 4)}$$

Now a profile determinant //Pr Det// is introduced, for which the following is true:

$$\|PrDet\| = \left\|\frac{Dp_{100\%}}{Db_{100\%}}\right\| = \left( \frac{V1p_{100\%}}{V1b_{100\%} \cdot \beta} \quad \cdots \quad \frac{V5p_{100\%}}{V5b_{100\%} \cdot \beta} \right) \quad \text{(Equation 5)}$$

where

//Dp$_{100\%}$ is the calibration profile matrix, and

//Db$_{100\%}$ is the profile determinant of the operating profile matrix.

When the method in the invention is used during operation by the user, the correction is made with the current profile matrix //APM//=//BPM//·//PrDef//:

$$\frac{1}{\beta} \cdot \begin{pmatrix} V1p_{100\%} & \cdots & V5p_{100\%} \\ \frac{V1p_{100\%}}{V1b_{100\%}} V1b_{50\%} & \cdots & \frac{V5p_{100\%}}{V5b_{100\%}} V5b_{50\%} \\ \vdots & \vdots & \vdots \\ \frac{V1p_{100\%}}{V1b_{100\%}} V1b_{10\%} & \cdots & \frac{V5p_{100\%}}{V5b_{100\%}} V5b_{10\%} \end{pmatrix} \cdot \begin{pmatrix} G_1 \\ G_2 \\ \vdots \\ G_5 \end{pmatrix} = \quad \text{(Equation 6)}$$

$$\begin{pmatrix} \sum Vbgec_{100\%} \\ \sum Vbgec_{50\%} \\ \vdots \\ \sum Vbgec_{10\%} \end{pmatrix}$$

where $\Sigma$ vbgec are the corresponding corrected average velocities or, flow quantities per cross section surface of the measuring tube in the measuring tube with the current flow profile.

In the form shown, Equation 6 applies only to media that behave linearly over the range considered from 10% to 100% of the nominal flow quantity. For nonlinear media, the corrections in the velocities of the medium along the measuring paths are made using the accompanying coefficients from the calibration profile matrix and the operating profile matrix, for example V1p50%/V1b50% for a velocity of the flowing medium on measuring path M1 of V1b50%. In the case of nonlinear media, it is also necessary to introduce the coefficients $\beta 1$, $\beta 2$ . . . $\beta 5$, see also Equation 3a. For nonlinear media, the correction coefficients are also interpolated between values known only discretely. After correction of the current flow profile using the calibration profile matrix and the operating profile matrix, the relative error in the average velocities and flow quantities can be calculated with the following equation:

$$Fe = \left(\left[\frac{\sum vbgec_i - \sum Vp_{100\%}}{\sum Vp_{100\%}}\right]^{max}\right)_{i=0\ldots100\%} \quad \text{(Equation 7)}$$

In summary, the profile matrices mentioned were used for processing as follows. First, using calibration, the velocities of the medium on the measuring paths and the accompanying average velocities and flow quantities were measured with an undisturbed calibration flow profile and then with an operating flow profile. Then the ratio between the average velocities and flow quantities when the calibration flow profiles was recorded and the operating flow profiles was found. After that, the current measured velocities of the medium along the measuring paths with the current flow profile are changed in accordance with that ratio. Then, the ratios of the velocities of the medium along the measuring paths with the calibration flow profile and the deviating velocities of the medium along the measuring paths with the operating flow profile are found, and the corresponding velocities of the medium along the measuring paths with the current flow profile are multiplied by those ratios. Of course, if necessary, this correction is made with an interpolation.

After the flow profile above is corrected, if the velocity is undisturbed, the Reynolds' number can be determined based on that flow profile.

As already mentioned, the correction in the flow profile that was mentioned is made as a correlation of the Reynolds' number. The calibration profile matrix given in Equation 1 can only be used for large Reynolds' numbers, roughly larger than 100,000, because in that case the right side of the Navier-Stokes hydrodynamic base vector equation disappears $$\frac{\partial \Omega}{\partial t} + \nabla \cdot (\Omega \cdot V) = \frac{1}{Re} \nabla^2 \cdot \Omega \qquad \text{(Equation 8)}$$

where
 $\Omega$ is the rotation of the velocity V, which means that $\Omega = V \cdot V$ and
 Re is the Reynolds' number.
 (See also Equation 41.23) in "The Feynman Lectures on Physics, Reading" by R. Feynman, R. Leighton, M. Sands, Massachusetts, Palo Alto, London, Addison-Wesley Publishing Company, Inc. 1964).

If the Reynolds' numbers age large, from the hydrodynamic equation 8, the hydrostatic base vector equation follows:

$$\frac{\partial \Omega}{\partial t} + \nabla \cdot (\Omega \cdot V) = 0 \qquad \text{(Equation 9)}$$

For this case, the properties of the medium, for example, the viscosity, were left out of consideration, since their influence is small. This small influence has as its result that the form of the flow profile in the uniformity range for Reynolds' numbers over 100,000 only changes insignificantly.

For the second case of smaller Reynolds' numbers, the influence of the properties of the medium is positively essential, so that it is necessary to use the calibration profile matrix in another form. During calibration, in this case, the viscosity of the medium (v) and the diameter (D) of the measuring tube are measured, so that for each calibration flow profile, a corresponding Reynolds' profile matrix //EPM–Re$_p$// in dimensionless form is obtained:

$$\|EPM - Re_p\| = \|EPM\| \cdot \frac{D}{v} = \begin{pmatrix} Re_{p,100\%} \\ Re_{p,50\%} \\ \vdots \\ Re_{p,10\%} \end{pmatrix} = \qquad \text{(Equation 10)}$$

$$\begin{pmatrix} \frac{V1p_{100\%}}{\Sigma Vp_{100\%}} & \cdots & \frac{V5p_{100\%}}{\Sigma Vp_{100\%}} \\ \frac{V1p_{50\%}}{\Sigma Vp_{100\%}} & \cdots & \frac{V5p_{50\%}}{\Sigma Vp_{100\%}} \\ \vdots & \cdots & \vdots \\ \frac{V1p_{10\%}}{\Sigma Vp_{100\%}} & \cdots & \frac{V5p_{10\%}}{\Sigma Vp_{100\%}} \end{pmatrix} \cdot \begin{pmatrix} G_1 \\ G_2 \\ \vdots \\ G_5 \end{pmatrix} \cdot \frac{D}{v}$$

Figure 2A:
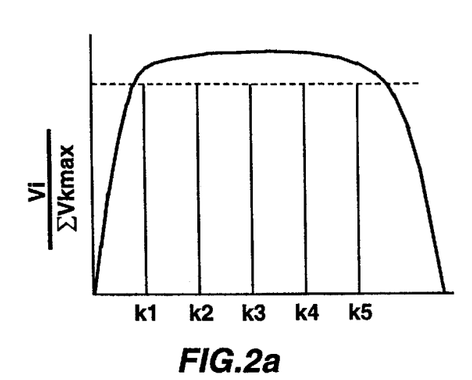

It can be inferred from Equation 10 that with the calibration done at the start for each Reynolds' number, a calibration profile for the device for using the ultrasound method of flow measurement in the invention can be stored in dimensionless form with compensation for tolerances (see FIG. 2a). Dimensionless means that the current velocities measured V1, . . . V5 are divided by the average velocity, hence the flow quantity per cross section surface area of the measuring tube at maximum flow quantity during calibration in the installed state of the device in the invention, so that Vkii=Vi/$\Sigma$ VK$_{max}$.

When calibration is in the installed state, according to Equation 2, and the operating flow profile deviates from the calibration flow profile, the velocities on the measuring paths and the average velocity, hence the flow quantity per cross sectional surface of the measuring tube, are determined as follows:

$$V1k_{max \cdot G1} \cdot \ldots \cdot V5k_{max} \cdot G_5\| = \|\Sigma Vk_{max}\| \qquad \text{(Equation 11)}$$

From this follows lastly the dimensionless operating profile matrix, which looks like this:

$$\left( \frac{V1k_{max}}{\Sigma Vk_{max}} \cdot G_1 \cdots \frac{V5k_{max}}{\Sigma Vk_{max}} \cdot G_5 \right) \qquad \text{(Equation 12)}$$

Figure 2B:
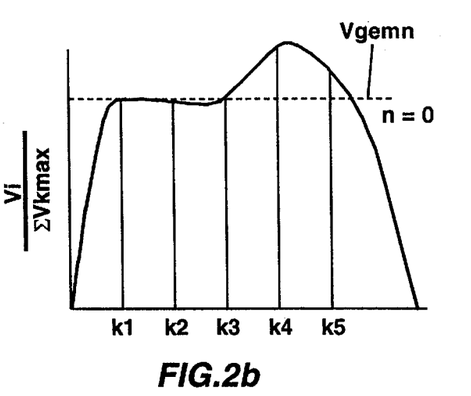

The dimensionless operating profile matrix is given in FIG. 2b.

Figure 2C:
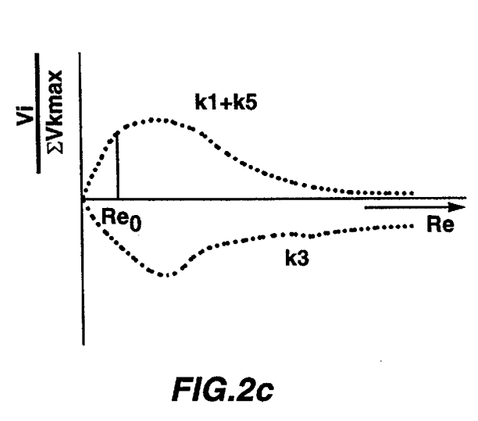
Figure 2D:
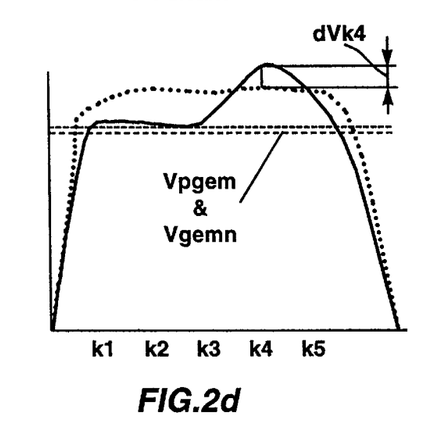
Figure 2E:
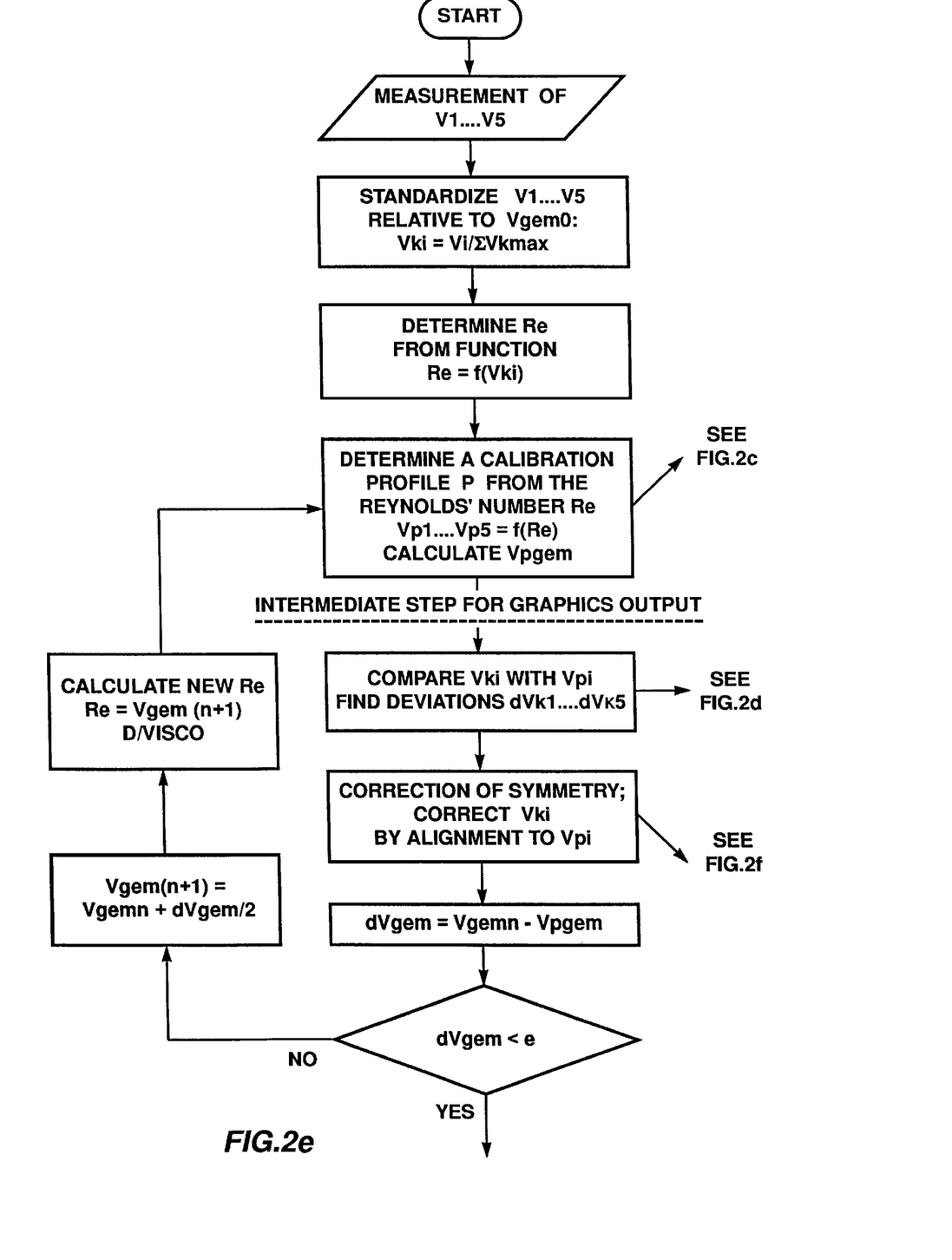
Figure 2F:
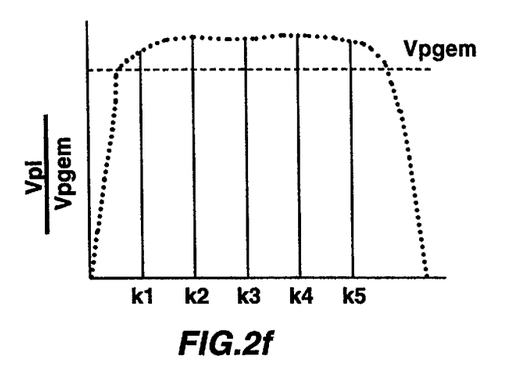

Based on velocities V1k, . . . V5k of the flowing medium measured during operation on measuring paths M1 to M5, the Reynolds' number is determined in zero approximation Re$_0$ using equations not yet explained For this Reynolds' number in zero approximation Re$_0$, using equation 10 for an identical Reynolds' number of the calibration Re$_p$, the velocities on the measuring paths, which can be shown in analytic form as functions, are determined from the calibration flow profiles (see FIG. 2c). From these velocities on the measuring paths, the average velocity Vpgem is determined at the same time. This profile is then compared with the current flow profile (see FIG. 2d), in which the average velocity found Vgemn (in zero approximation n=0, hence Vgem0) is compared with the average velocity Vpgem of the calibration flow profile (dVgem=Vgemn–Vpgem). If the difference between the average velocities is greater than a certain maximum value $\epsilon$, then in a subsequent iteration process a smaller difference is assumed, for example Vgem(n+1)=Vgemn+dvgem/2. From the new Average velocity, the Reynolds' number Re$_1$ of the first approximation from the equation Re$_1$=Vgem1·D/v is determined. Using this Reynolds' number in first approximation, from the stored calibration profile matrix, a new average velocity is found, which is then in tern compared (see FIGS. 2e and 2f). If the difference found dVgem is smaller than the maximum value given $\epsilon$, the last value found for the Reynolds' number is used to correct the flow quantity. Improved precision is guaranteed using the iteration process described.

Figure 3A:
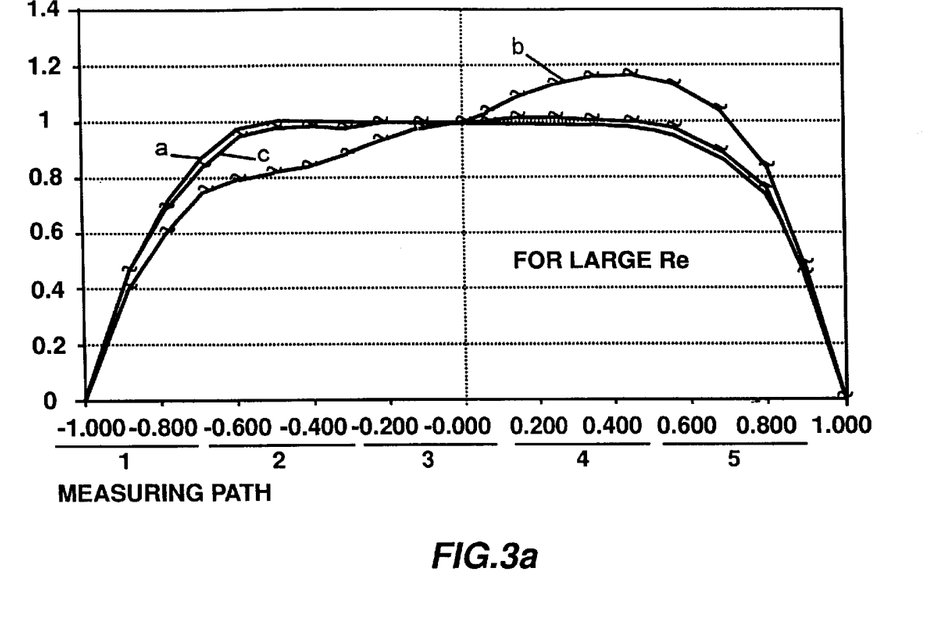
Figure 3B:
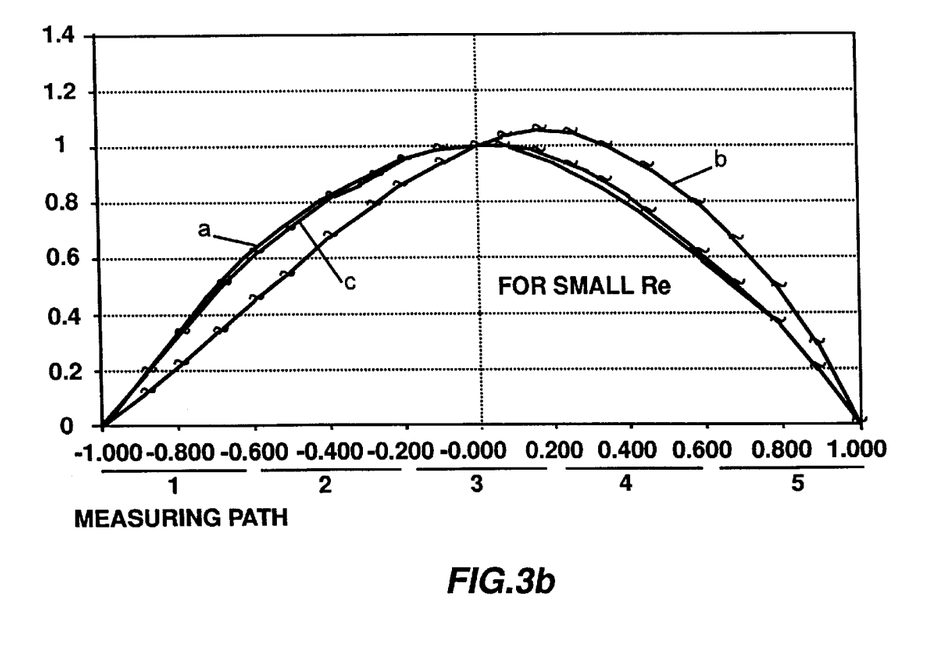

FIGS. 3a and 3b show examples of corrected dimensionless flow profiles for large Reynolds' numbers (FIG. 3a) and small Reynolds' numbers (FIG. 3b). In both figures, a is for the calibration flow profile, b the disturbed operating flow profile and c the corrected operating flow profile.

After the correction of the flow profile described, the last value found for the Reynolds' number is forwarded to the flow corrector 6 to correct the flow quantity. The whole method takes place in real time.

Figure 4A:
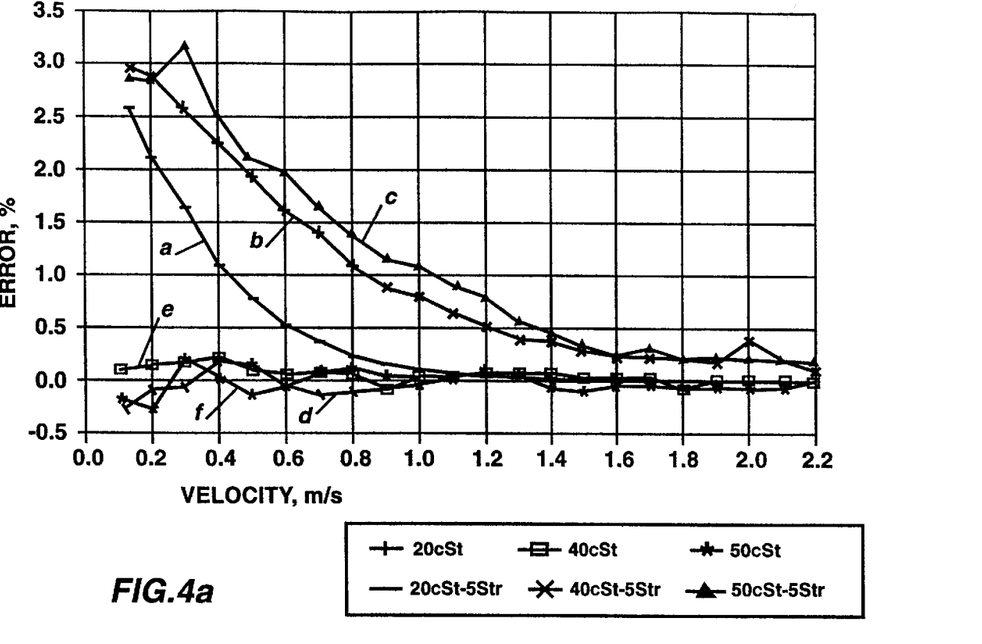
Figure 4B:
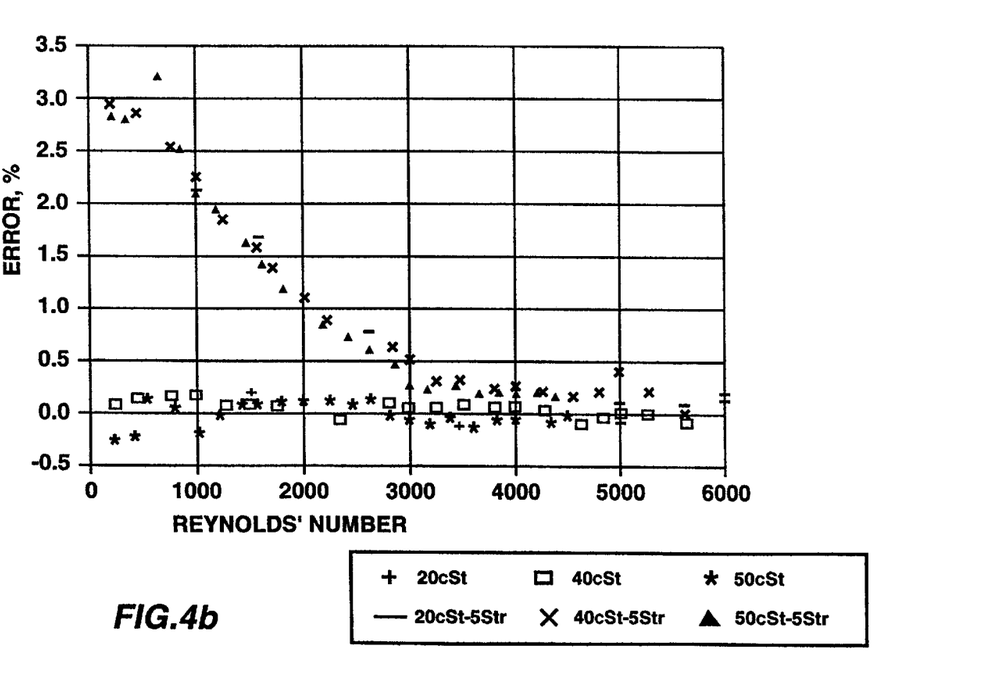

FIGS. 4a and 4b show graphs of the increased precision with the invention. FIG. 4a shows, for an example of embodiment with five measurement paths, the percentage of errors with three media with different viscosities (20 cSt, 40 cST and 50 cSt) as a correlation of the velocity in m/s with a state-of-the-art method (see curves a, b and c) and with the device in the invention using an ultrasound method of measuring the flow of flowing media (see curves d, e and f). Here it is clear that the percentage of error in values, for the most part over 0.5% with the state-of-the-art methods, is reduced by the method in the invention to values under 0.2% for all three media.

FIG. 4b shows, for the same three media with different viscosities, the percentage of errors for the same measurement results that are shown in FIG. 4e, but now not as a function of the velocity, but as a function of the Reynolds' number, in turn before and after correction. Here, what is striking is that all three curves a, b and c basically coincide when shown as a function of the Reynolds' number. Here again, it is clear that the precision is decisively improved with the ultrasound flow-measurement method in the invention.

Depending on whether the flow profile has a turbulent or a laminar character, the Reynolds' number is determined as follows:

For a flow profile with a turbulent character, the Reynolds' number is found from the velocity ratios or differences in measuring paths 2 and 4 ($V_2+V_4$) and measuring paths 1 and 5 ($V_1+V_5$).

For a flow profile with laminar character, the Reynolds' number is found from the velocity ratios or differences in the velocities on measuring paths 2 and 4 ($V_2+V_4$) and measuring path 3 ($V_3$).

The Reynolds' number can thus be found based on velocity ratios (case a) for the velocities on the measuring paths and also based on velocity differences (case b) for the velocities on the measuring paths both for flow profiles with turbulent characters and for flow profiles with laminar characters.

For case a, where the Reynolds' number is found based on the velocity ratios, there is a flow profile with laminar character under the following condition:

$$(V_2+V_1)/V_3<1.9 \quad \text{(Equation 13)}$$

Inversely, a flow profile has a turbulent character when the following applics:

$$(V_2+V_4)/V_3<1.9 \quad \text{(Equation 14)}$$

The following equations for determining the Reynolds' number were found empirically.

For a flow profile with laminar character, the following applies to the Reynolds' number.

$$Re_1=19100((V_2+V_4)/V_3)^2-60200(V_2+V_4)/V_3+47700 \quad \text{(Equation 15)}$$

In contrast, for a flow profile with a turbulent character, for the Reynolds' number, if it is smaller than 30,000, the following applies $$Re_1=6500+39000\sqrt{(5.14(V_2+V_4)/(V_1+V_5)-5.22)} \quad \text{(Equation 16)}$$

For a Reynolds' number >20,000, with a flow profile with a turbulent character, the following is true.

$$Re_1=5080000((V_2+V_4)/(V_1+V_5))_2-108600000(V_2+V_4)/V_1+V_5)+5833000 \quad \text{(Equation 17)}$$

For case b, in which the Reynolds' number is determined based on velocity diffe4ences, the flow profile has a laminar character, if the following is true:

$$(V_2+V_4)-1.9V_3<0 \quad \text{(Equation 18)}$$

Inversely, there is a flow profile with a turbulent character if:

$$(V_2+V_4)-1.9V_3>0 \quad \text{(Equation 19)}$$

If the flow profile has a laminar character, the following now applies:

$$Re_1=A_1((V_2+V_4)-(V_1+V_5)/2)^2+B_1((V_2+V_4)-(V_1+V_5))/2+C_1 \quad \text{(Equation 20)}$$

In contrast, the following is true of a flow profile with a turbulent character for Reynolds' numbers smaller than 30,000:

$$Re_1=A_2((V_2+V_4)-(V_1+V_5)/2)^2+B_2((V_3+V_4)-(V_1+V_5))/2+C_2 \quad \text{(Equation 21)}$$

Finally, for Reyolds' numbers greater than 20,000 and flow profiles with turbulent character, the following is true:

$$Re_1=A_3((V_2+V_4)-(V_1+V_5)/2)^2+B_3((V_2+V_4)-(V_1+V_5))/2+C_3 \quad \text{(Equation 22)}$$

The coefficients $A_1$ to $A_3$, $B_1$ to $B_3$ and $C_1$ to $C_3$ in Equations 20 to 22 are found empirically.

Figure 5:
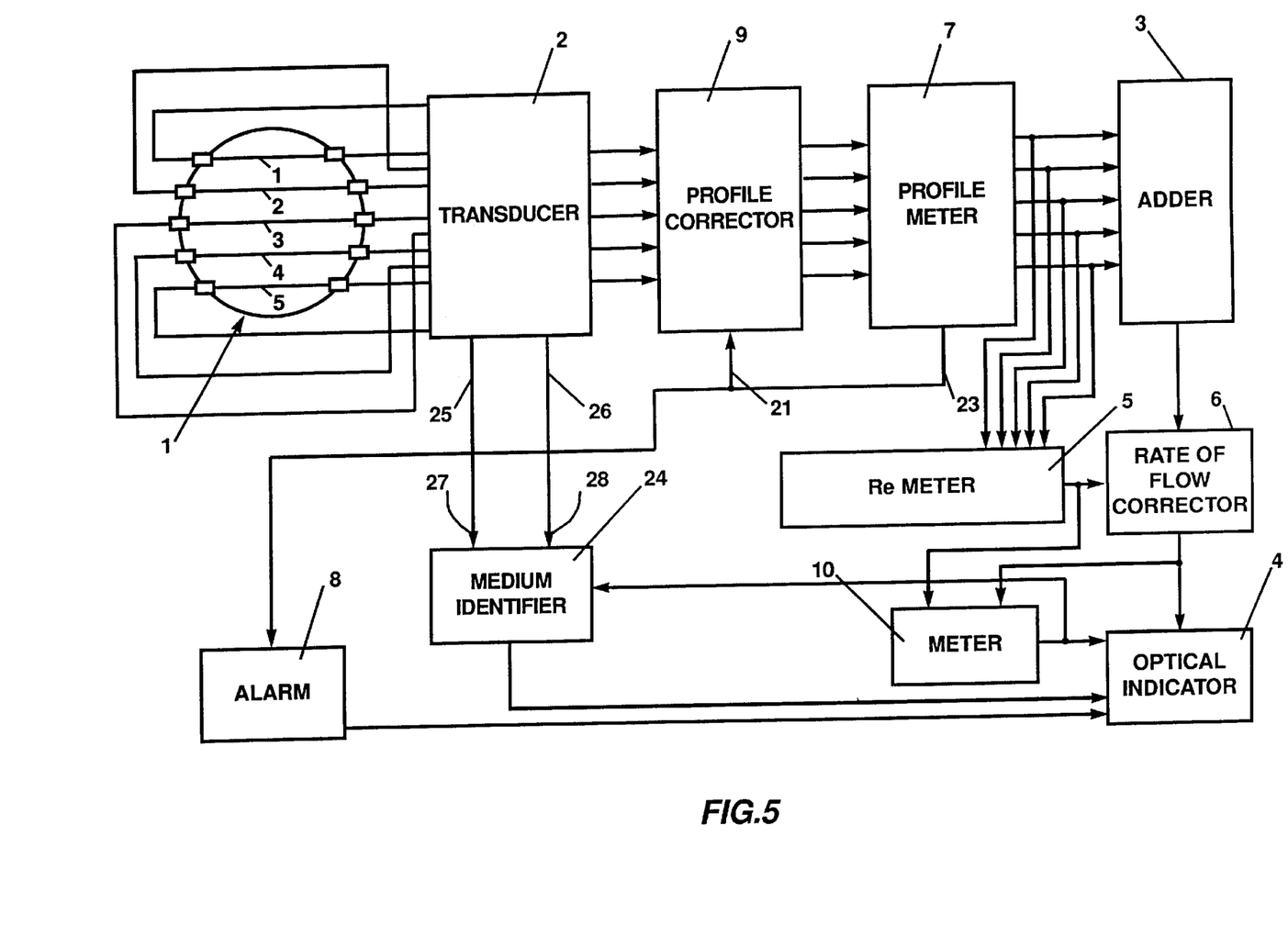
FIG. 5 shows a block diagram of a second example of embodiment of the device in the invention for using an ultrasound method of measuring flowing media.

As already described, for the purpose of smooth functioning of the flow corrector during operation by the user, the current flow profile is controlled for deviations from the calibration flow profiles or asymmetries. This control is done using a profile meter 7 and a profile corrector 9, connected between the transducer 2 and the adder 3. They are explained below with reference to FIGS. 5 and 6. The profile meter 7 compares the velocities on the measuring paths and if there are profile deviations or a defective sensor, it gives a special signal from its output 23 to the profile corrector 9 and to an alarm 8. Now, during installation, due to installation or inlet effects like curvatures and comparable disturbances, if a disturbed flow profile occurs, the deviation in this disturbed flow profile from the calibration flow profiles or the asymmetries in the disturbed flow profile can basically be eliminated by the profile corrector 9. This profile corrector 9 works on the basis of Equations 1 to 12. A switch 22 shown in FIG. 6, forming a unit inside the profile corrector 9, has three settings: setting a for flow profile calibration, setting b for flow profile adjustment and setting c for flow profile monitoring.

Figure 6:
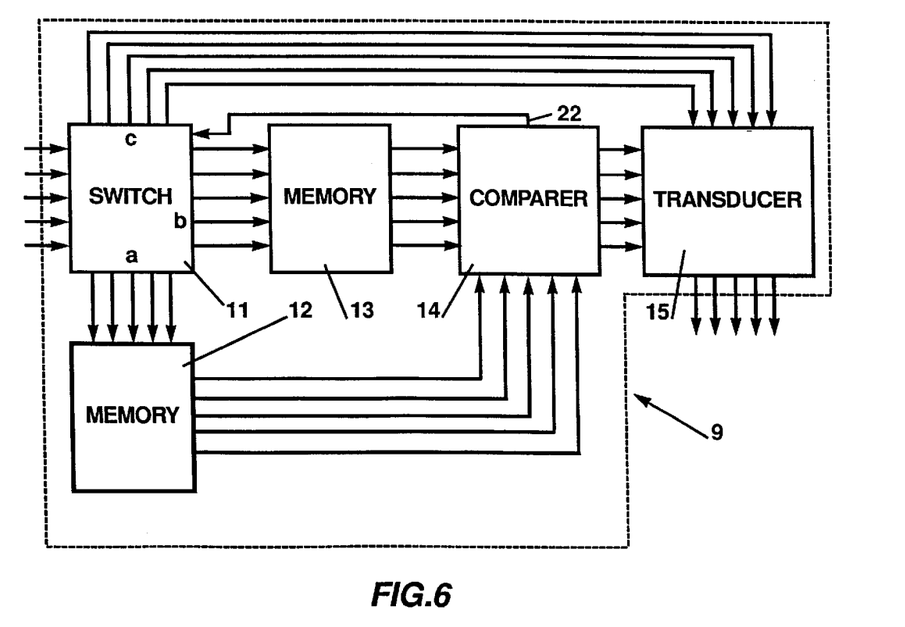
FIG. 6 shows a block diagram of an example of embodiment for a flow-profile corrector.

Switch 11 is in setting a if the device in the invention using an ultrasound method of measuring the flow of flowing media is calibrated with an undisturbed reference flow profile. In this setting, the calibration profile matrix //EPM// is stored in the calibration flow profile memory 12 (see also Equation 1).

If the device in the invention using the ultrasound method of measuring the flow of flowing media is installed by the user, the flow Entity in the like connected to the device in the invention is basically set at the maximum possible flow quantity during operation. In this case, switch 11 is in setting be In this setting, the operation profile matrix //BPM// is stored in an operating profile memory 13 (see also Equation 2) Next a profile compare 14 determines the profile determinants //PrDet// based on Equations 3, 4 and 5.

Figure 8:
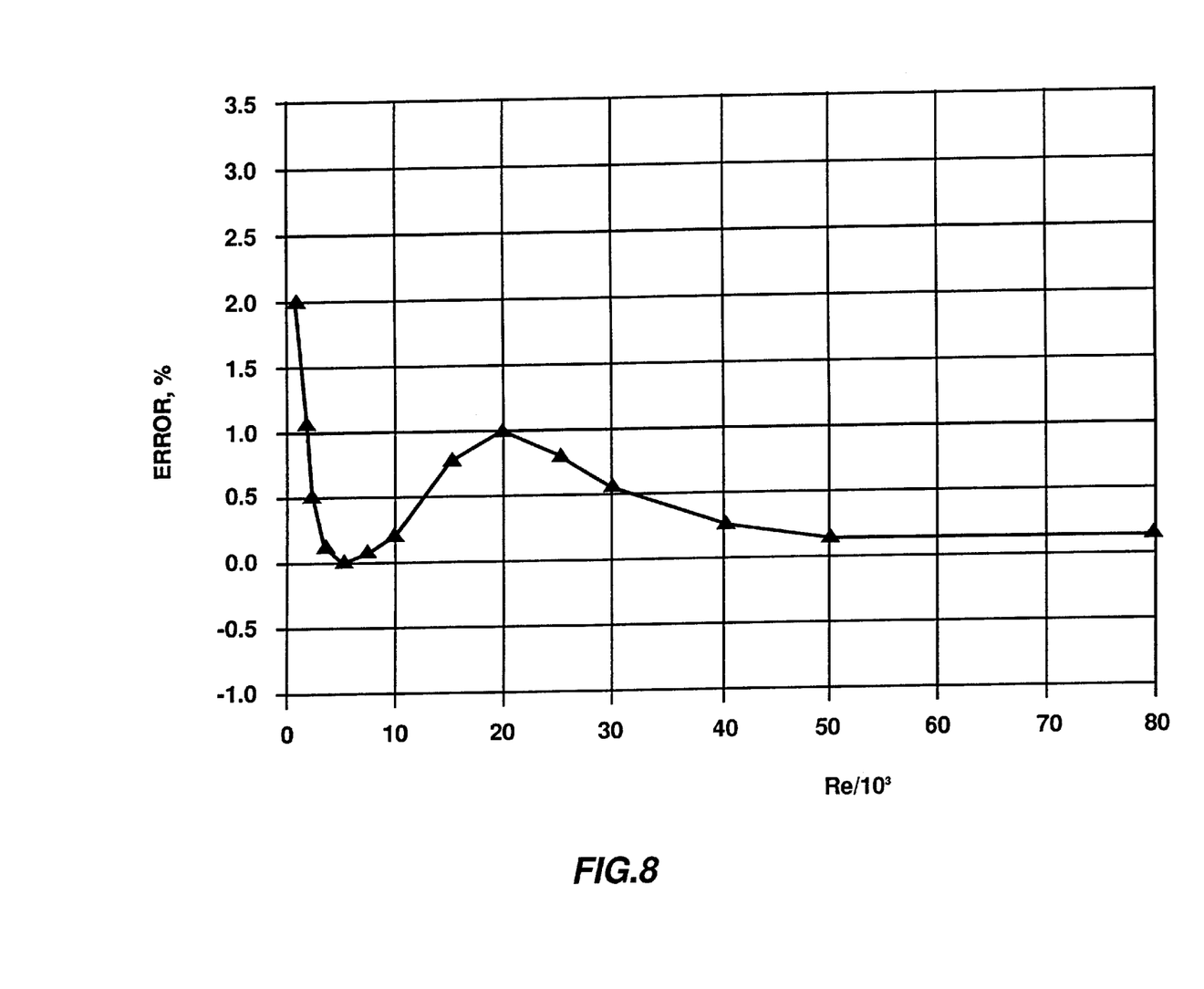
FIG. 8 shows an example of an error curve based on empirical data for use in a flow corrector according to the invention and FIGS. 9 a)–d) shows the dependence of various velocity ratios on the Reynolds' number to explain the function of the method and the device in the invention.

Under normal conditions, switch 11 is in setting C during operation, so that the information on the velocities on the measuring paths is forwarded from the switch 11 directly to a profile transducer 15, which works according to Equation 6. At the output of the profile transducer 15, in principle, an undisturbed and corrected flow profile is available. Based on this flow profile, the Reynolds' number is determined in the Reynolds' number meter 5. which is then made available to the flow corrector 6. This flow corrector 6 works with an error curve that also takes into account technological tolerances of the device. FIG. 8 shows an example of such an error curve, wherein a maximum error of 0.15% is guaranteed by using this error curve.

If there are changes in the line connecting to the measuring tube or other hydraulic transitional processes, for example, if a control valve closes, the flow profile changes very quickly. This change is controlled by the profile meter 7, and if the change is significant, it gives a signal via output 23 to the alarm 8 and the profile corrector 9 (see also FIG. 6). In the profile corrector 9, the switch 11 is then switched from setting c to setting b. In this setting, the operating flow profile provided by the operating profile memory 13 is compared with the calibration flow profile from the calibration flow profile memory 12. If there is too great a deviation between these two flow profiles, a feedback signal is given to switch 11 via the feedback output 22, whereupon an operating flow profile is filed again in the operating flow profile memory 13. This happens until there is a corrected operating flow profile in real time, which is then fed back to the transducer 15 by switch 11 in setting c.

Figure 7:
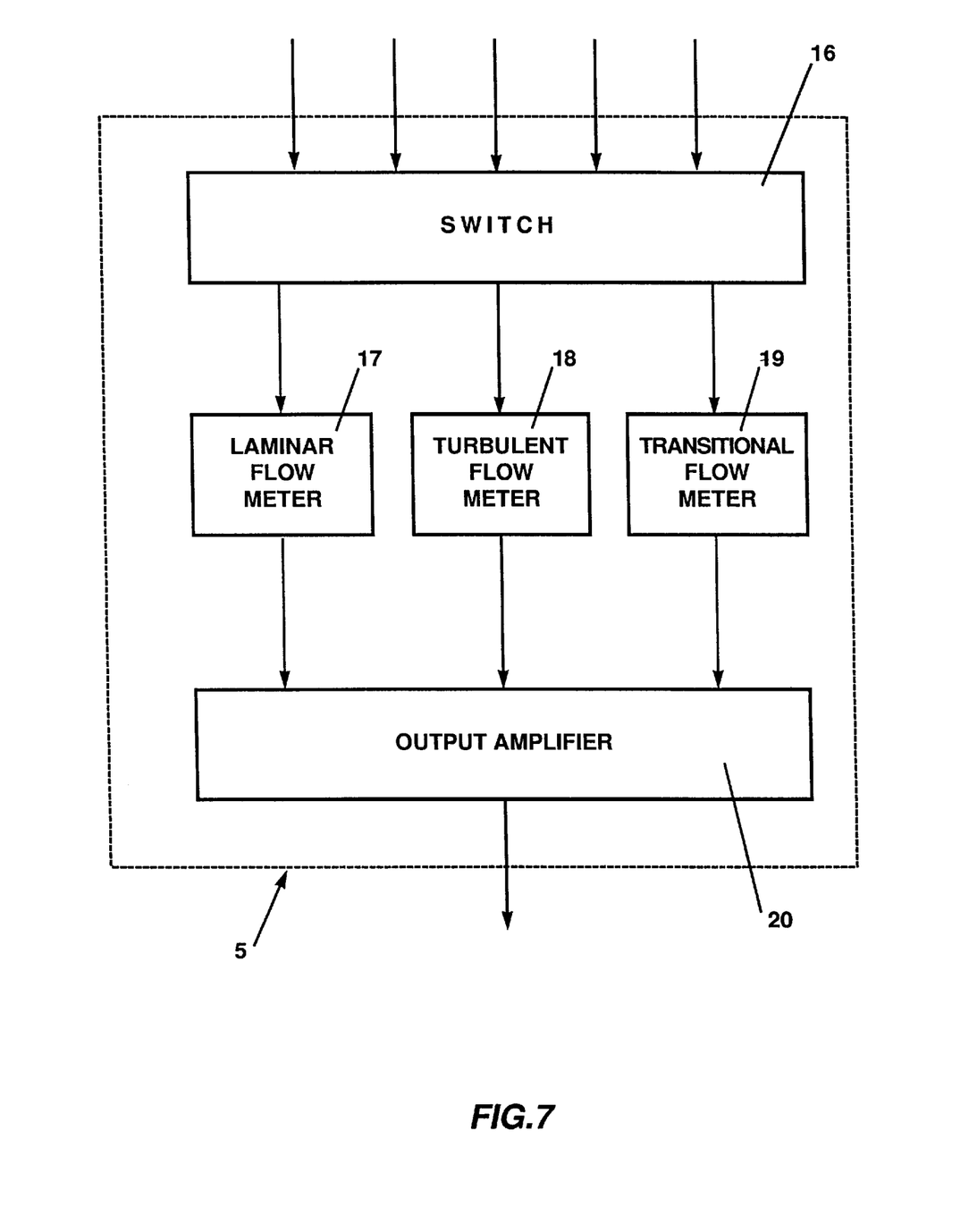
FIG. 7 shows a block diagram of an example of embodiment for a Reynolds' number meter.

The values for the velocities at the output of the profile meter 7 are fed to the Reynolds' number meter 5 as well as to the adder 3 (see also FIGS. 7 and 8). A turbulent laminar switch 16 in this Reynolds' number meter 5 works based on equations 13 and 14 or 18 and 19. This turbulent laminar switch 16 is connected to a laminar flow meter 17, a turbulent flow meter 18 and a transitional flow meter 19, wherein these flow meters 17, 18 and 19 work based on Eqations 15, 16 and 17 or 20, 21 and 22. The values at the outputs of these flow meters 17, 18 and 19 for the Reynolds' number are then fed to an operations output amplifier 20.

Figure 9A:
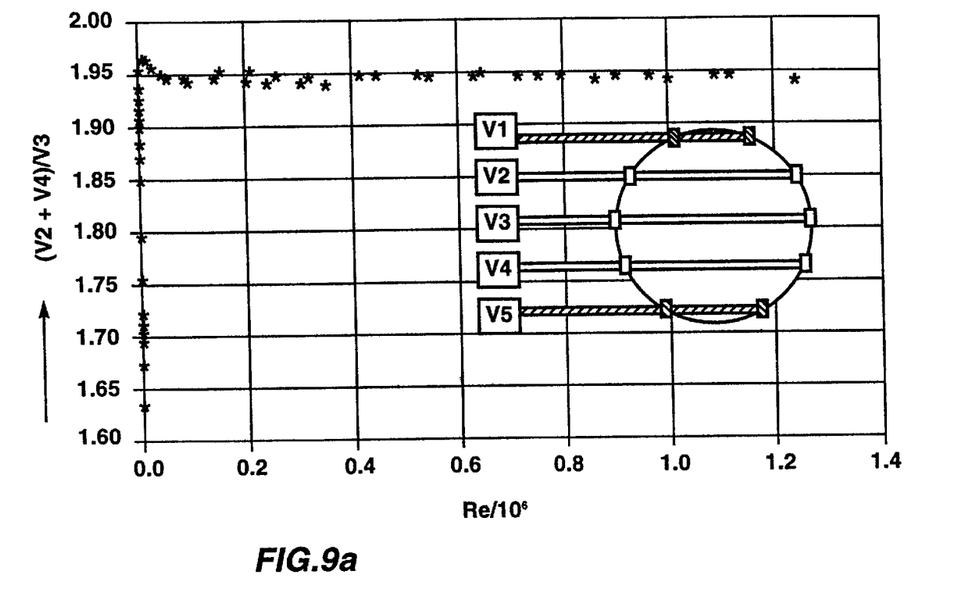
Figure 9B:
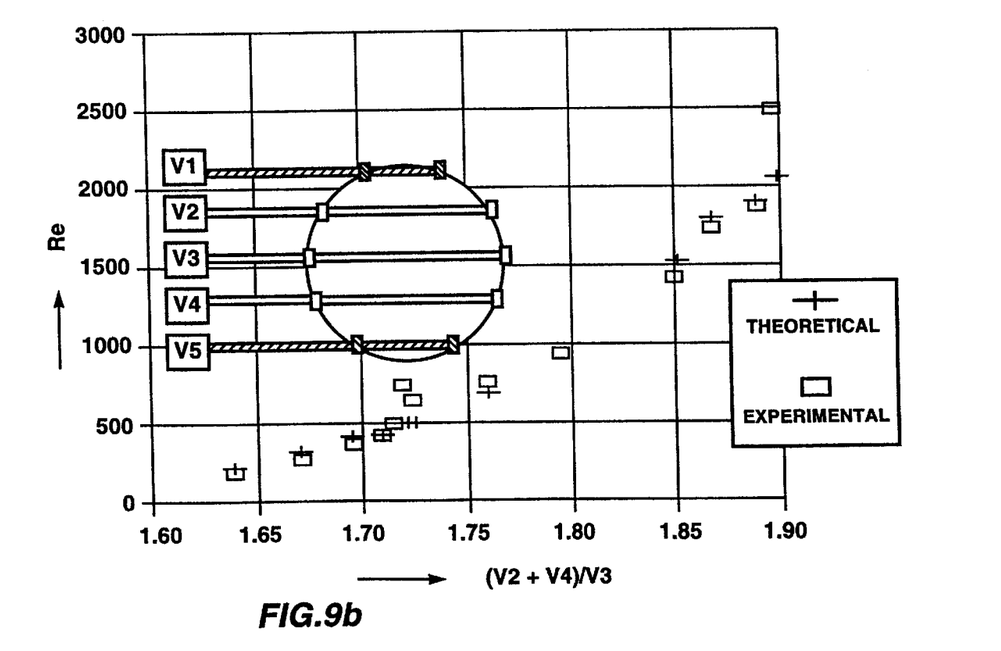
Figure 9C:
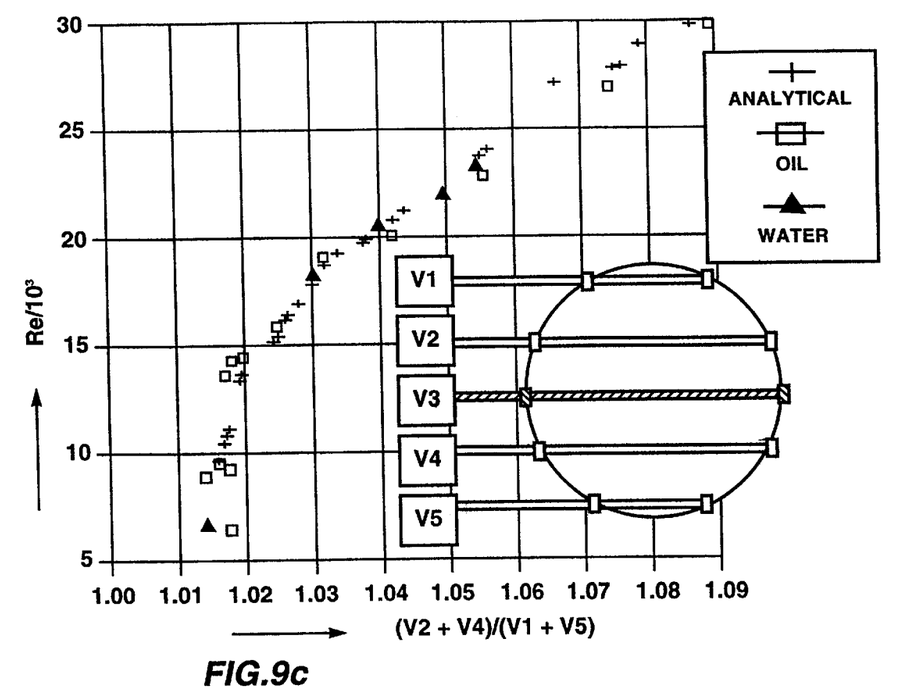
Figure 9D:
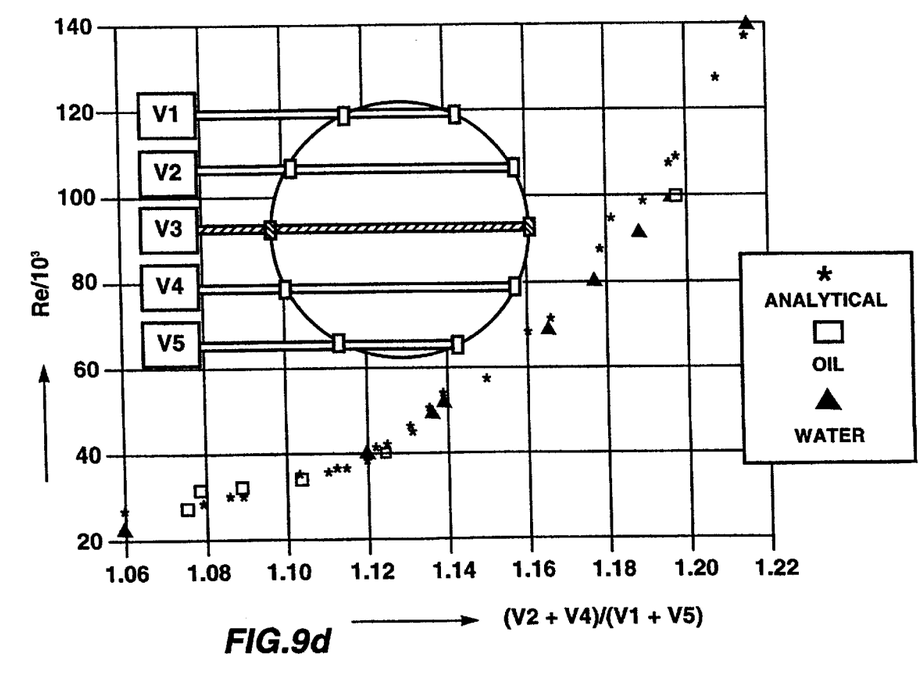

In FIGS. 9a to 9d, the ratios on which the function of the Reynolds' number meter 5 is based are shown graphically as an example. FIG. 9a shows a graph of the ratio $(V_2+V_4/V_3)$ as a function of the Reynolds' number, which is traced in millions, whose course the action of the turbulent laminar switch 16 affects. FIG. 9b shows a graph of the Reynolds' number as a function of the ratio $(V_2V_4/V_3)$ whose curve the action of the laminar flow meter 17 affects. FIG. 9b shows both experimentally determined measurement data and theoretical data. FIGS. 9c and 9d show the dependence of the Reynolds' number, which is traced in increments of a thousand, on the ratio $(V_2+V_4/(V_1+V_5))$, whose curve the processing in the turbulent flow meter 18 affects. FIGS. 9c and 9d show the connections mentioned both for measurement data, with oil and water as the flowing media, and also for theoretically determined data. For 9c, it is true to some extent that the Reynolds' number is smaller than 30,000, while for FIG. 9d it is true that the Reynolds' number is somewhat larger than 20,000.

The value determined in real time at the output of the operation output amplifier 20 for the Reynolds' number is fed to a viscosity meter 10 as well as to the flow corrector 6. This viscosity meter 10 determines the viscosity of the medium, based on the Reynolds' number, the average velocity, hence the flow quantity per cross sectional surface area of the measuring tube and the diameter of the measuring tube 1.

The viscosity value at the output of the viscosity meter 10 is sent on first to a display device 4 and then to a medium identifier 24. This medium identifier 24 also provides the ultrasound velocity determined by the transducer 2 within the medium and/or the ultrasound damping of the medium. Based on the viscosity of the medium, the ultrasound velocity in the medium and/or the ultrasound damping of the medium, the medium identifier 24 determines the type of medium, for ale, the type of petroleum, by making a comparison with data stored for down media.

We claim:

1. An ultrasound method of measuring the flow of a flowing medium, using a measuring tube and at least two pairs of ultrasound transducers arranged on the measuring tube forming a measuring path, in which the rate of flow of the flowing medium is determined from the velocities of the medium along at least two measuring paths, wherein the Reynolds' number of the flowing medium is measured continuously and the value for the rate of flow is corrected using the value for the Reynolds' number, wherein the Reynolds' number is determined using the velocities of the medium along at least two measuring paths.

2. The method according to claim 1, characterized by the fact that the rate of flow is corrected using the value for the Reynolds' number and an error curve based on empirical data.

3. The method according to claim 1, characterized by the fact that the Reynolds' number is determined using an arithmetical algorithm from the velocities of the medium along different measuring paths.

4. The method according to claim 3, characterized by the fact that the Reynolds' number is determined based on ratios of said velocities along different measuring paths.

5. The method according to claim 3, characterized by the fact that the Reynolds' number is determined based on subtractions of the velocities along different measuring paths.

6. An ultrasound method of measuring the rate of flow of a flowing medium, using a measuring tube and at least two pairs of ultrasound transducers arranged on the measuring tube forming a measuring path, in which the rate of flow of the flowing medium is determined from the velocities of the medium along at least two measuring paths, wherein the Reynolds' number of the flowing medium is measured continuously and the value for the rate of flow is corrected using the value for the Reynolds' number, wherein the velocities of the flowing medium V1, V2, V3, V4 and V5 are determined along five different measuring paths 1 to 5, and wherein a turbulent flow for (V2+V4)/V3>1.9 and a laminar flow for (V2+V4)/V3<1.9 is assumed.

7. The method according to claim 6, wherein the case of a turbulent flow, the Reynolds' number is determined from the velocity ratios or differences in the sum of the velocities along measuring paths 2 and 4 (V2+V4) and the measuring paths 1 and 5 (V2+V5), and wherein in the case of a laminar flow it is determined from the velocity ratios or differences in the sum of the velocities along measuring paths 2 and 4 (V2+V4) and measuring path 3 (V3).

8. The method according to claim 7, wherein for a laminar flow, the Reynolds' number is determined from the velocity ratios as follows:

$$Re_l = 19100((V_2+V_4)/V_3)^2 - 60200(V_2+V_4)/V_3 + 47700.$$

9. The method according to claim 8, wherein for a turbulent flow, the Reynolds' number is determined as follows from the velocity ratios:

$$Re_t < 30000 Re_t = 6500 + 39000((5,14(V_2+V_4)/V_1+V_5) - 5,22)^{1/2} Re_t = 5080000((V_2+V_4)/(V_1+V_5))^2$$

$$Re_t > 20000 - 108600000(V_2+V_4)/(V_1+V_5) + 5833000.$$

10. The method according to claim 8, wherein for laminar flow, the Reynolds' number is determined from the velocity difference as follows:

$$Re_1 = A_1((V_2+V_4)-(V_1+V_5)/2)^2 + B_1((V_2+V_4)-V_1+V_5))/2 + C_1$$

where $A_1$, $B_1$, and $C_1$ are determined empirically.

11. The method according to claim 8, wherein for a turbulent flow, the Reynolds' number is determined as follows from the velocity differences:

$$Re_t < 30000 \; Re_t = A_2((V_2+V_4)-(V_1+V_5)/2)^2 + B_2((V_2+V_4)-(V_1+V_5))/2 + C_2$$

$$Re_t < 20000 \; R_t = A_3((V_2+V_4)-(V_1+V_5)/2)^2 + B_3(V_2+V_4)-(V_1+V_5))/2 + C_3,$$

where $A_2$, $B_2$, $C_2$, $A_3$, $B_3$ and $C_3$ are determined empirically.

12. The method according to claim 6, wherein in a calibration process, calibration flow profiles that are as undisturbed as possible are recorded from the velocities of the medium along the measuring paths for various rates of flow and Reynolds' numbers.

13. The method according to claim 12, wherein in a calibration process, at least one operating flow profile is recorded with the help of a device mounted and ready to operate that uses the method according to anyone of claims 6 to 12.

14. The method according to claim 13, wherein deviations between the calibration flow profiles and the operating flow profiles are corrected arithmetically.

15. The method according to claim 14, wherein for Reynolds' numbers greater than 100,000, to record the operating flow profile, rates of flow for the medium are set that correspond as much as possible to the rates of flow when the calibration flow profile is recorded, wherein the ratios between the individual velocities along the measuring paths of the calibration flow profile and the operating flow profile are determined, wherein with these ratios, the current measured velocities along the measuring paths are corrected, and wherein that with this correction, the measured velocities are also corrected with the ratios of the rates of flow when the calibration flow profiles are recorded and when the reference flow profiles are recorded.

16. The method according to claim 15, wherein the correction factors between the rates of flow set during the recording of the calibration flow profile and the operating flow profile are determined using interpolation.

17. The method according to claim 14, wherein especially for Reynolds' numbers smaller than 100,000, the calibration profiles are measured and stored in dimensionless form for a large number of Reynolds' numbers, wherein the current measured velocities and the current rate of flow for a dimensionless current flow profile are processed, and wherein the dimensionless current flow profile is compared with the calibration flow profiles and corrected by using said comparison.

18. The method according to claim 17, wherein:
the Reynolds' number in zero approximation is determined from the current flow profile;
the average velocity is determined from the flow profile stored for the Reynolds' number in zero approximation;
the average velocity from the memory is compared with the current average velocity, if there is a deviation between the average velocities above a predetermined limit, a new current average velocity is assumed that deviates less from the average velocity from the memory;
the Reynolds' number is determined in first approximation from the new currently determined velocity;
the average velocity is determined again from the flow profile stored with the Reynolds' number in first approximation;
if there is a new deviation above the predetermined limit, a new current average velocity is again taken that deviates less from the average velocity from the memory; and otherwise, the last value for the Reynolds' number is used for further processing.

19. The method according to claim 6, wherein the viscosity of the medium is determined using the rate of flow, the diameter of the measuring tube and the Reynolds' number.

20. The method according to claim 19, wherein the medium is identified using the viscosity and particularly other medium-dependent measured variables.

21. The method according to claim 20, wherein the ultrasound velocity and/or the ultrasound damping of the medium are determined as another medium-dependent measured variable.

22. The method according to claim 6, wherein the rate of flow is corrected using the value for the Reynolds' number and an error curve based on empirical data.

23. The method according to claim 6, wherein the Reynolds' number is determined using the velocities of the medium along at least two measuring paths.

24. The method according to claim 23, wherein the Reynolds' number is determined using an arithmetical algorithm from the velocities of the medium along different measuring paths.

25. The method according to claim 24, wherein the Reynolds' number is determined based on ratios of said velocities along different measuring paths.

26. The method according to claim 24, wherein the Reynolds' number is determined based on subtractions of the velocities along different measuring paths.

27. An ultrasound method of measuring the rate of flow of a flowing medium, using a measuring tube and at least two pairs of ultrasound transducers arranged on the measuring tube forming a measuring path, in which the rate of flow of the flowing medium is determined from the velocities of the medium along at least two measuring paths, wherein the Reynolds' number of the flowing medium is measured continuously and the value for the rate of flow is corrected using the value for the Reynolds' number wherein in a calibration process, calibration flow profiles that are undisturbed as possible are recorded from the velocities of the medium along the measuring paths for various rates of flow and Reynolds' numbers.

28. The method according to claim 27, wherein the viscosity of the medium is determined using the rate of flow, the diameter of the measuring tube and the Reynolds' number.

29. The method according to claim 28, wherein the medium is identified using the viscosity and particularly other medium-dependent measured variables.

30. The method according to claim 29, wherein the ultrasound velocity and/or the ultrasound damping of the medium are determined as another medium dependent measured variable.

31. The method according to claim 27, wherein the rate of flow is corrected using the value for the Reynolds' number and an error curve based on empirical data.

32. The method according to claim 27, wherein the Reynolds' number is determined using the velocities of the medium along at least two measuring paths.

33. The method according to claim 32, wherein the Reynolds' number is determined using an arithmetical algorithm from the velocities of the medium along different measuring paths.

34. The method according to claim 33, wherein the Reynolds' number is determined based on ratios of said velocities along different measuring paths.

35. The method according to claim 33, wherein the Reynolds' number is determined based on subtractions of the velocities along different measuring paths.

36. The method according to claim 27, wherein in a calibration process, at least one operating flow profile is recorded with the help of a device mounted and ready to operate that uses the method according to any one of claims 27 to 35.

37. The method according to claim 36, wherein deviations between the calibration flow profiles and the operating flow profiles are corrected arithmetically.

38. The method according to claim 37, wherein for Reynolds' numbers greater than 100,000, to record the operating flow profile, rates of flow for the medium are set that correspond as much as possible to the rates of flow when the calibration flow profile is recorded, wherein the ratios between the individual velocities along the measuring paths of the calibration flow profile and the operating flow profile are determined, wherein with these ratios, the current measured velocities along the measuring paths are corrected, and wherein that with this correction, the measured velocities are also corrected with the ratios of the rates of flow when the calibration flow profiles are recorded and when the reference flow profiles are recorded, preferably wherein the correction factors between the rates of flow set during the recording of the calibration flow profile and the operating flow profile are determined using interpolation.

39. The method according to claim 37, wherein especially for Reynolds' numbers smaller than 100,000, the calibration profiles are measured and stored in dimensionless less form for a large number of Reynolds' numbers, wherein the current measured velocities and the current rate of flow for a dimensionless current flow profile are processed, and wherein the dimensionless current flow profile is compared with the calibration flow profiles and corrected by using said comparison.

40. The method according to claim 39 wherein:
the Reynolds' number in zero approximation is determined from the current flow profile; the average velocity is determined from the flow profile stored for the Reynolds' number in zero approximation; the average velocity from the memory is compared with the current average velocity, if there is a deviation between the average velocities above a predetermined limit, a new current average velocity is assumed that deviates less from the average velocity from the memory; the Reynolds' number is determined in first approximation from the new currently determined velocity; the average velocity is determined again from the flow profile stored with the Reynolds' number in first approximation, and if there is a new deviation above the predetermined limit, a new current average velocity is again taken that deviates less from the average velocity from the memory; and otherwise, the last value for the Reynolds' number is used for further processing.

41. An ultrasound method of measuring the rate of flow of a flowing medium, using a measuring tube and at least two pairs of ultrasound transducers arranged on the measuring tube forming a measuring path, in which the rate of flow of the flowing medium is determined from the velocities of the medium along at least two measuring paths, wherein the Reynolds' number of the flowing medium is measured continuously and the value for the rate of flow is corrected using the value for the Reynolds' number, wherein the viscosity of the medium is determined using the rate of flow, the diameter of the measuring tube and the Reynolds number.

42. An ultrasound method of measuring the rate of flow of a flowing medium, using a measuring tube and at least two pairs of ultrasound transducers arranged on the measuring tube forming a measuring path, in which the rate of flow of the flowing medium is determined from the velocities of the medium along at least two measuring paths, wherein the Reynolds' number of the flowing medium is measured continuously and the value for the rate of flow is corrected using the value for the Reynolds' number, wherein the viscosity of the medium is determined using the rate of flow, the diameter of the measuring tube and the Reynolds' number, and wherein the medium is identified using the viscosity and particularly other medium-dependent measured variables.

43. The method according to claim 42, wherein the ultrasound velocity and/or the ultrasound damping of the medium is determined as another medium dependent measured variable.

44. The method according to claim 41 or 42, wherein the rate of flow is corrected using the value for the Reynolds' number and an error curve based on empirical data.

45. The method according to claim 44, wherein the Reynolds' number is determined using the velocities of the medium along at least two measuring paths.

46. The method according to claim 45, wherein the Reynolds' number is determined using an arithmetical algorithm from the velocities of the medium along different measuring paths.

47. The method according to claim 46, wherein the Reynolds' number is determined based on ratios of said velocities along different measuring paths.

48. The method according to claim 46, wherein the Reynolds' number is determined based on subtractions of the velocities along different measuring paths.

49. A device for using the ultrasound method of measuring the rate of flow for a flowing medium, the method using a measuring tube and at least two pairs of ultrasound transducers arranged on the measuring tube forming a measuring path, in which the rate of flow of the flowing medium is determined from the velocities of the medium along at least two measuring paths, wherein the Reynolds' number of the flowing medium is measured continuously and the value for the rate of flow is corrected using the value for the Reynolds' number, the device comprising a measuring tube, at least two pairs of ultrasound transducers arranged on the measuring tube and forming a measuring path, a transducer that determines the velocities of the medium along the measuring paths from the signals of the pair of ultrasound transducers, and an adder that determines the rate of flow of the medium from the velocities of the medium along the measuring paths, wherein the device comprises a Reynolds' number meter continuously finding the Reynolds' number and a flow corrector connected to the Reynolds' number meter and the adder, wherein there are a profile corrector and a profile meter one after the other between the transducer and the adder, and wherein the profile corrector has a switch at the input, an operating flow profile memory connected behind the switch, a flow profile compare connected behind the operating flow profile memory, a profile transducer at the output, and a calibration flow profile memory connected with its input behind an output of the switch and its output in front of one input of the flow profile compare, wherein another output of the flow profile compare is connected to another input of the switch, and wherein if the calibration flow profile and the operating flow profile are not identical, the switch, the operating flow profile memory and the flow profile compare form a feedback loop.

50. The device according to claim 49, wherein the Reynolds' number meter includes a turbulent-laminar switch and, connected in parallel to the turbulent-laminar switch, a laminar flow meter, a turbulent flow meter, a transitional flow meter, and an output operation amplifier connected with the output of the laminar-flow meter, the turbulent-flow meter and the transition-flow meter.

51. The device according to claim 49, wherein it has a viscosity meter connected to the output of Reynolds' number meter and the output of the flow corrector.

52. The device according to claim 51, characterized by the fact that a medium identifier connected to the output of the viscosity meter and to at least one input with outputs of the transducer is provided for identifying the type of medium by comparing the viscosity and the ultrasound velocity and/or the ultrasound damping with stored values, and the transducer determines the ultrasound velocity or the ultrasound damping.

53. A device for using the ultrasound method of measuring the rate of flow for a flowing medium, the method using a measuring tube and at least two pairs of ultrasound transducers arranged on the measuring tube forming a measuring path, in which the rate of flow of the flowing medium is determined from the velocities of the medium along at least two measuring paths, wherein the Reynolds' number of the flowing medium is measured continuously and the value for the rate of flow is corrected using the value for the Reynolds' number, the device comprising a measuring tube, at least two pairs of ultrasound transducers arranged on the measuring tube and forming a measuring path, a transducer that determines the velocities of the medium along the measuring paths from the signals of the pair of ultrasound transducers, and an adder that determines the rate of flow of the medium from the velocities of the medium along the measuring paths, wherein the device comprises a Reynolds' number meter continuously finding the Reynolds' number and a flow corrector connected to the Reynolds' number meter and the adder, wherein the Reynolds' number meter includes a turbulent-laminar switch, connected in parallel to the turbulent-laminar switch, a laminar flow meter, a turbulent flow meter, a transitional flow meter, and an output operation amplifier connected with the output of the laminar-flow meter, the turbulent-flow meter and the transition-flow meter.

54. The device according to claim 53, wherein it has a viscosity meter connected to the output of Reynolds' number meter and the output of the flow corrector.

55. The device according to claim 54, wherein a medium identifier connected to the output of the viscosity meter and to at least one input with outputs of the transducer is provided for identifying the type of medium by comparing the viscosity and the ultrasound velocity and/or the ultrasound damping with stored values, and the transducer determines the ultrasound velocity or the ultrasound damping.

* * * * *